GETTER ASSEMBLY

Filed March 21, 1967 3 Sheets-Sheet 1

INVENTORS
HOWARD S. PATTIN
VINCENT PIETRASZ
CLAIR W. REASH
BY Leo A. Plum, Jr.
ATTORNEY

INVENTORS
HOWARD S. PATTIN
VINCENT PIETRASZ
CLAIR W. REASH
BY
ATTORNEY

INVENTORS
HOWARD S. PATTIN
VINCENT PIETRASZ
CLAIR W. REASH
BY Leo A. Plum, Jr.
ATTORNEY

United States Patent Office 3,390,758

Patented July 2, 1968

3,390,758

GETTER ASSEMBLY

Clair W. Reash, Fairview Park, Vincent Pietrasz, Cleveland, and Howard S. Pattin, Lakewood, Ohio, assignors to Union Carbide Corporation, a corporation of New York Filed Mar. 21, 1967, Ser. No. 624,819
15 Claims. (Cl. 206—.4)

ABSTRACT OF THE DISCLOSURE

A channel ring getter container having a heat shield for use particularly in large television picture tubes. A nonconducting insulating member is permanently mounted on the getter container in an aligned relationship for ease of mounting in the television tube.

*Background of the invention*

This invention relates to an improved getter assembly and more particularly to an improved channel ring getter assembly for mounting in a television picture tube against a wall thereof without danger of damaging said wall during flashing of the getter material.

The use of getter materials in the manufacture of electronic tubes is well known. A commonly used getter construction consists of a container, such as an annular U-shaped receptacle, with the getter material pressed into the container. This assembly is mounted in an electron tube, for example, a television picture tube. After the tube is evacuated, the residual gases left in the tube are removed by heating the getter container and material therein to a high temperature, suitably by induction heating, whereupon the getter material is flashed or vaporized. The vaporized getter material adsorbs or reacts with the residual gases and removes them as low vapor pressure solid condensates and continues to adsorb any further liberated gases throughout the life of the tube.

Usually the getter material principally comprises: a mixture or alloy of metals such as, for example, barium and aluminum. It is the barium component of this mixture which provides the reactive material. The clean up of residual gases in the larger sized television picture tubes, and particularly color tubes, requires a relatively large amount of active barium material. For example, color tubes having three electron guns and a metal shadow mask have been found to require a yield of 125 to 175 mg. of barium. Since the barium-aluminum powder mixture might have contained up to about 50% aluminum, the total amount of gettering powder mixture in the container before flashing could be from 250 to 350 mg. It has further been found desirable to employ exothermic gettering powders in color television picture tubes. An exothermic gettering powder can comprise: a barium-aluminum alloy or mixture plus about an equal weight of powdered nickel. The nickel reacts exothermically with the aluminum upon heating to supply additional heat for evaporating the barium. This self-generated heat lessens the getter flashing time from say 30 seconds for an endothermic type getter to about 15 or 20 seconds with the exothermic type getter.

A typical channel ring exothermic getter used in color television picture tubes thus may contain, for example, 500 mg. of a 25 percent barium-25 percent aluminum-50 percent nickel exothermic alloy yielding about 125 mg. of barium on heating. The getter container itself may comprise a U-shaped channel formed into a ring of, for example, about 1 inch outside diameter and having a channel width of say 0.1 inch. The getter powder is pressed into the channel. The flashing of the getter requires heating to a high temperature, about 1300° C., to vaporize the barium, or whatever getter material is utilized. As a result of this heating, the residue and the channel ring container are themselves heated to a high temperature. This heating results in the melting or sintering of the residue, either the aluminum powder in an endothermic getter, the barium-nickel-aluminum powder in the case of the exothermic alloy described above, or whatever unflashed material is present. The container itself, generally stainless steel, is itself heated to a temperature often near its melting point; and in the case of improperly formed or positioned getter assemblies, the stainless steel ring may melt.

The presence of this extremely hot getter container in a glass-walled electron tube can cause serious problems as will be seen from the following: An electron tube, particularly a television picture tube generally comprises a neck portion in which are located the electron gun or guns and auxiliary equipment; an enlarged bulb portion which terminates in a generally flat viewing screen; and a funnel-shaped portion joining the neck and bulb portions. Whereas in the past, the ring shaped getter container was usually mounted in the neck portion of the tube positioned on the electron gun, it is now a desired practice to mount the getter container in or near the funnel portion of the tube. Since the getter container must be outside the path of the stream of electrons directed from the electron gun toward the screen, and since the diameter of the funnel cross-section at the selected site may be only slightly larger than that of the neck portion, it is necessary to have the getter container actually abutting against the wall of the tube. This is accomplished by mounting the getter container at the end of a spring-like metallic strip support or "antenna," the other end of which is fixed to a wall of the electron gun in the neck portion of the tube. The spring is biased to force the getter container against the wall of the tube in the funnel portion and thus keep clear the path for the electron beam.

This positioning of the getter container in direct contact with the glass walls of the tube can and often does cause cracking of the glass when the getter container is heated inductively to high temperatures during flashing. Since the television tube is for the most part completely fabricated just prior to gettering, the cracking of the tube at this time is a substantial loss. In addition it is important that the getter container be properly aligned inside the tube so that the gettering flash is properly directed. Such alignment is difficult to achieve using normal production line techniques.

*Summary of the invention*

According to the present invention, an improved getter assembly is provided for mounting in an electron tube in an abutting relationship to a wall of the tube, said assembly comprising a channel container having opposing side walls and a bottom wall connecting said side walls and having getter material pressed into the space formed by said side walls and the bottom wall, a thermally insulating member underlying the bottom wall of the container, said insulating member having a recess extending across its lower face, a metallic support member positioned in the recess against the bottom wall thereof with end portions of the metallic member joined to opposite portions of the getter container so as to hold the insulator member in place under the getter container, whereby the getter assembly can be mounted in an electron tube with the underlying insulator member abutting a glass wall of the tube and insulating the glass wall from the metallic getter container.

The insulating member has an upper face and a lower face. The upper face is that side of the member which contacts the base of the channel ring getter. The lower, or opposite, face of the member rests against the wall of the tube. A portion of the upper face of the member may be patterned to fit inside the central opening generally found in channel ring getter containers. The lower face of the insulating member is positioned according to the support arrangement described hereafter, so that it abuts the curved wall of the tube, generally in at least two widely spaced-apart points, thereby positioning itself and the overlying getter container in a stable relationship and at a preselected angle to the tube interior for most effective getter flashing. Additionally in another embodiment, the bottom face of the insulating member is convex or domed shaped so that the convex surface of the member rests on and curves with the generally concave surface of the tube.

In another embodiment of the invention, the insulating member, which is generally disc-shaped to match the circular configuration of a common channel ring getter, has flattened edges for automatic delivery to an assembly station and as an aid to efficient welding of the getter assembly to the antenna support arm. A preferred form of the invention comprises a channel container formed into a circular or ring shape, said channel having opposing side walls and an annular bottom wall connecting said side walls and having getter material pressed into the space formed by the side walls and the bottom wall, a disc-shaped insulating member underlying the bottom wall of the container, said disc-shaped member having on its upper face a raised central circular portion or hub fitting inside the circular open core of the ring container with the annular peripheral ledge portion of said member face abutting the bottom wall of the channel, the bottom face of said disc-shaped member having a recess extending across a diameter of the disc, said recess having a depth sufficient to expose the bottom wall portions of the getter container at each end of the recess, an elongated metallic member positioned in the recess against the bottom wall thereof with said metallic member connected near each end of the recess to the respective exposed bottom wall portions of the container thereby supporting the insulating member in place under the container, one end of said metallic member extending past the edge of the ring container to form a projection or tab suitable for attachment to an antenna support arm. The getter assembly is thus mounted on the end of a flexible spring-like antenna support arm by overlapping the end of the support arm over the tab portion of the metallic member and lap welding the two members together. The other end of the antenna arm is fixed to the gun structure in the neck of the tube so that the getter assembly extends down into the funnel or bulb of the tube. The spring-like support arm is shaped to bias the getter assembly against the wall of the tube with only the insulating member actually contacting the tube. Proper alignment of the getter assembly in the tube is facilitated by squaring off an edge of the disc-shaped member perpendicular to and near the tab portion of the metallic member whereby a squared-off end of a band-like antenna arm may be abutted squarely against the squared off edge of the disc-shaped member to assure axial alignment of the antenna arm and the tab portion of the metallic member. The disc-shaped member may have squared off portions at each end of the recess to allow use of either side of the disc member when putting the getter assembly together and to provide guides for the automatic transport and registry of the components at an assembly station.

The above and other embodiments of this invention are set forth in the drawings, the description following and the appended claims.

*The drawings*

*Preferred embodiment*

Figures 1, 2, 3, 4, 5, 6:
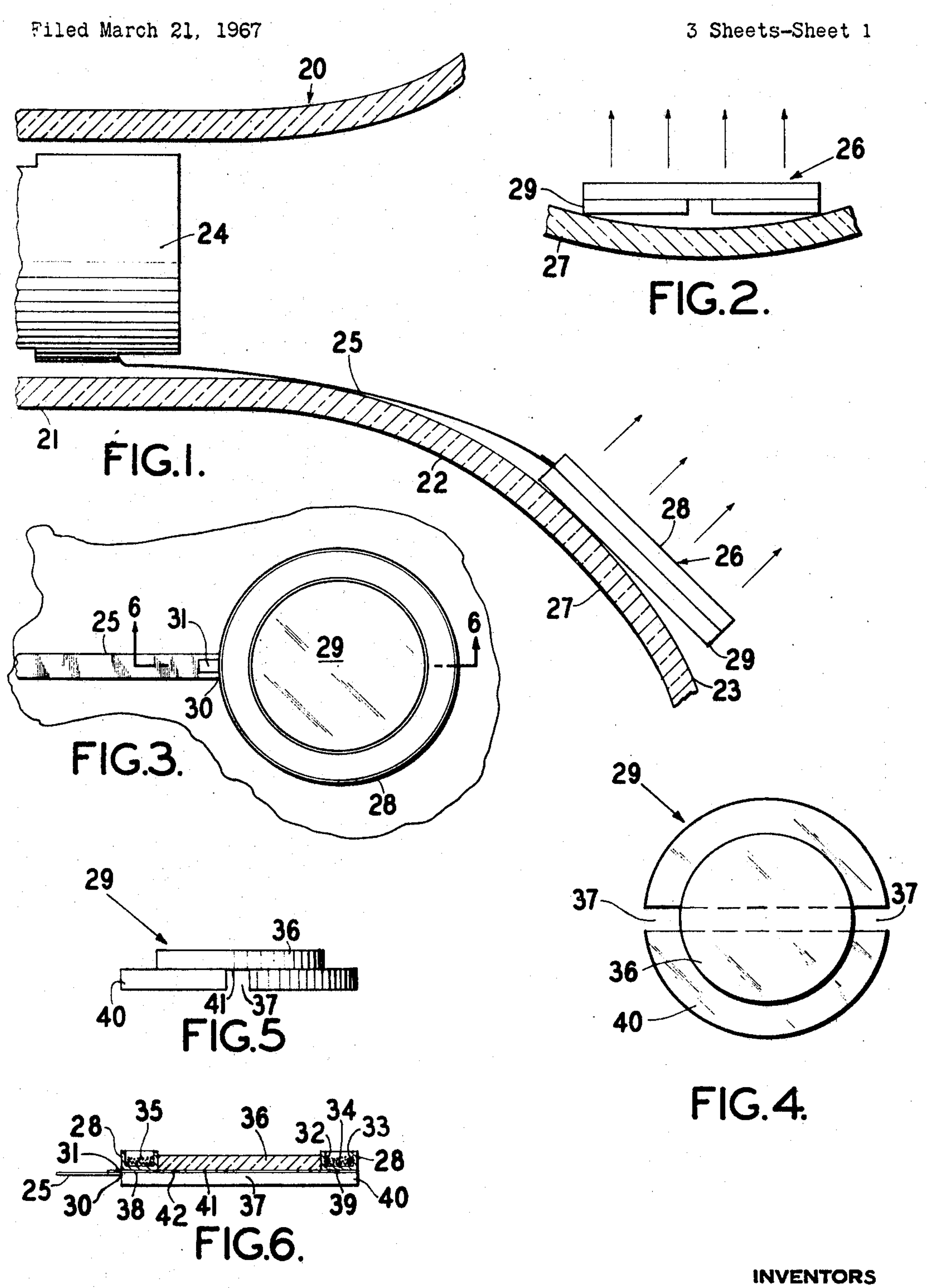
FIG. 1 is a partial schematic view of the neck and funnel portions of a television picture tube, in cross-section, including a getter assembly of the present invention, mounted in an "antenna" position.
FIG. 2 is a partial view of the arrangement of FIG. 1 looking from the neck into the funnel of the tube.
FIG. 3 is a plan view of the portion of a picture tube and getter assembly of FIG. 1.
FIG. 4 is a plan view of the insulator member used in the getter assembly shown in FIG. 1.
FIG. 5 is a side view of the insulator member shown in FIG. 4.
FIG. 6 is a view in cross-section of the getter assembly of FIG. 1.

Referring now to FIG. 1, a portion 20 of a typical glass television tube is shown. Such a tube may be viewed as having three main parts, a neck portion 21, a funnel portion 22, and the bulb or main tube, only a portion 23 of which is shown. Of course it is understood that any divisions between these parts of a tube are only arbitrary and it is not meant here that the novel getter assembly of this invention can only be used in a funnel location. Under suitable circumstances the getter assembly of this invention could be mounted nearer to the gun in the neck or further into the bulb of the tube as desired. Additionally it is to be understood that the getter asembly of this invention can be used in electron tubes and other evacuated devices other than television picture tubes and that such other uses are intended to be included within the scope of this invention.

More specifically, an electron gun 24 is shown positioned in the neck of the tube. An antenna spring or support arm 25 is shown fixed at one end to the side wall of the gun and having mounted on its opposite end the getter assembly 26 of this invention. The support arm 25 is a piece of thin flexible metal strip biased to urge the getter asembly 26 against the wall 27 of the tube, in the case shown, in the funnel portion of the tube. The getter assembly comprises a channel ring getter container 28 and underlying insulator member 29. As seen in FIGS. 1 and 2 the insulator member 29 is the only part of the getter assembly 26 which actually contacts the glass wall 27 of the tube. In FIG. 2, which is a view parallel to the gun axis, the insulator member 29 is seen to touch the tube at its two outer edges, widely spaced apart and resulting in a stable positioning of the assembly assuring properly directed flashing of the vaporized material into the tube as shown by the arrows.

FIG. 3 shows the plan view of the getter container 28 as a ring shaped member. The insulator member 29 is visible in the open core of the ring container. The end 30 of the antenna support arm 25 is shown fixed to a tab 31 which is a part of the getter assembly, as hereinafter set forth.

FIGS. 4, 5 and 6 show an insulator member 29 having a generally disc-shaped configuration and a diameter about the same as that of the channel ring getter container 28. When assembled under the getter container ring, the insulator thus shields and insulates the glass wall of the tube from the getter container which, when heated to flash the getter material, will attain temperatures high enough to crack the glass if not protected. The insulator member should be composed of a thermally non-conductive material, such as a ceramic material, for example alumina, silica, or any other suitable insulator. The insulator material should also be electrically non-conductive so that it will not be coupled to the electric field used to flash the getter and be itself heated. The insulator material should also be inert and should not outgas under the high vacuum conditions in the gettered tube. The getter material is preferably opaque so as to shield the glass wall from any radiative heating from the hot getter container.

More specifically, the getter container 28 is seen to be composed of a channel member having opposing side walls 32 and 33 and annular bottom wall 34 connecting the side walls. The getter material 35 is pressed into the space formed by the side walls and bottom wall. The channel member has its ends joined to form the conventional ring shape.

The insulator member 29 has a raised central portion or hub 36 on its upper surface. This raised portion 36 fits into the core of the ring container. The insulator member has at least one recess 37 extending across a diameter of the member and of a depth sufficient to expose the undersurfaces 38 and 39 of the annular bottom wall 34 of the channel member. In the embodiment shown, this depth is the same as the thickness of the main or ledge portion 40 of the insulator member. Generally the bottom wall 41 of the recess 37 is parallel to and lies in the plane of the bottom walls of the ring container. A metallic support member or bar 42 is positioned in the recess and welded to the underside of the bottom walls at points 38 and 39 and thus holds the insulator member 29 in place under the ring container 28 by pressing against the wall 41. The bar 42 has an extension or tab portion 31 which forms a site for connection to the free end 30 of the antenna support arm 25 as indicated generally in FIGS. 1 and 3. The bar 42 should have a thickness less than the depth of the recess 37 so that no part of the bar 42 is in contact with the glass wall of the tube. More than one recess can be formed in the insulator member with additional mounting bars used for each recess. These recesses need not extend across diameters of the member but can extend across shorter chords of the circular member, if desired.

As an indication of the general size of the assembly, the following typical dimensions are given: the channel ring container may have an overall diameter of about 1.0 inch with a core opening of about 0.75 inch, with an annular channel space of about 0.1 inch width for holding getter material. The insulator member will have an overall diameter of about 1.0 inch and a raised island of about 0.74 inch diameter which, under normal manufacturing tolerances, should fit into the container core opening easily. The height of the raised portion of the insulator member is about 0.05 inch. The thickness of the ledge portion is also about 0.05 inch giving an overall thickness of about 0.1 inch for the insulator member. The depth of the recess is thus about 0.05 inch. The width of the recess is about 0.1 inch. The support member or mounting bar is of thin sheet stock and of a width just less than the width of the recess. The channel ring container and mounting bar are usually made of stainless steel for corrosion resistance. The above dimensions are typical for a getter container of about 1 inch diameter. Other sizes of containers, larger or smaller than that described above, will have insulator members of corresponding dimensions. It is to be noted that the hub portion is dimensioned so as to easily fit inside the container opening. It is understood that if a noncircular channel container is involved, then this raised portion will be shaped to conform to that particular opening, as will be the rest of the insulator member.

Figure 7:
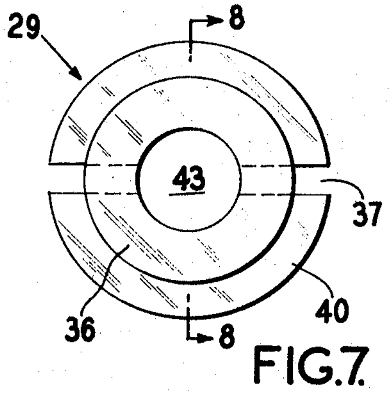
FIG. 7 is a plan view of another embodiment of an insulator member.
Figure 8:
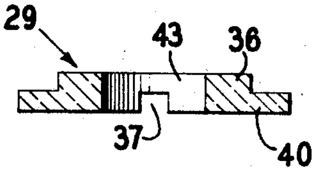
FIG. 8 is a view in cross-section taken along line 8—8 of FIG. 7.

FIGS. 7 and 8 show another embodiment of the invention wherein the insulator member 29 itself has a central core cut out 43. This opening, which could be about 0.375 inch for a 1 inch diameter member, extends through both the raised portion 36 and the main portion 40 of the member. The recess 37 runs to the core opening 43 and the mounting bar extends across the core opening.

Figure 9:
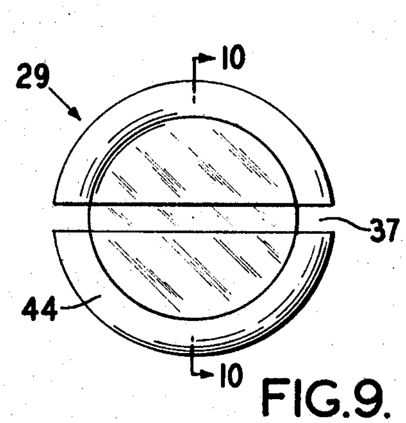
FIG. 9 is a bottom view of another embodiment of an insulator member.
Figure 10:
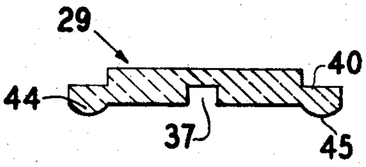
FIG. 10 is a view in cross-section taken along line 9—9 of FIG. 10.

FIGS. 9 and 10 show another embodiment of the invention wherein an annular ridge or raised portion 44 extends around the periphery of the insulator member 29. This ridge is situated on the lower face of the ledge portion 40 and has a rounded surface 45 for smoothly contacting the glass wall of the tube. The recess 37 extends across the ridge at opposite sides of the member. The width of the ridge may be about the same as the width of the channel ring, for example about .125 inch, to afford the greatest depth of insulating material under the channel ring which will be the hottest part of the container. The total height of the ledge plus ridge may be about 0.1 inch. This insulator member may be cored (not shown) if desired.

Figure 12:
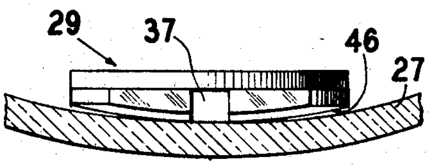
FIG. 12 is a partial view of the arrangement of FIG. 11 looking from the neck into the funnel of the tube.
Figure 13:
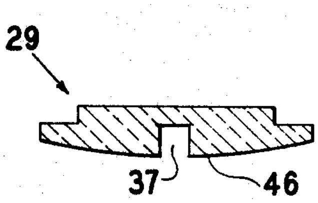
FIG. 13 is a view in cross-section of the insulator member of FIG. 11.
Figures 11, 15, 16:
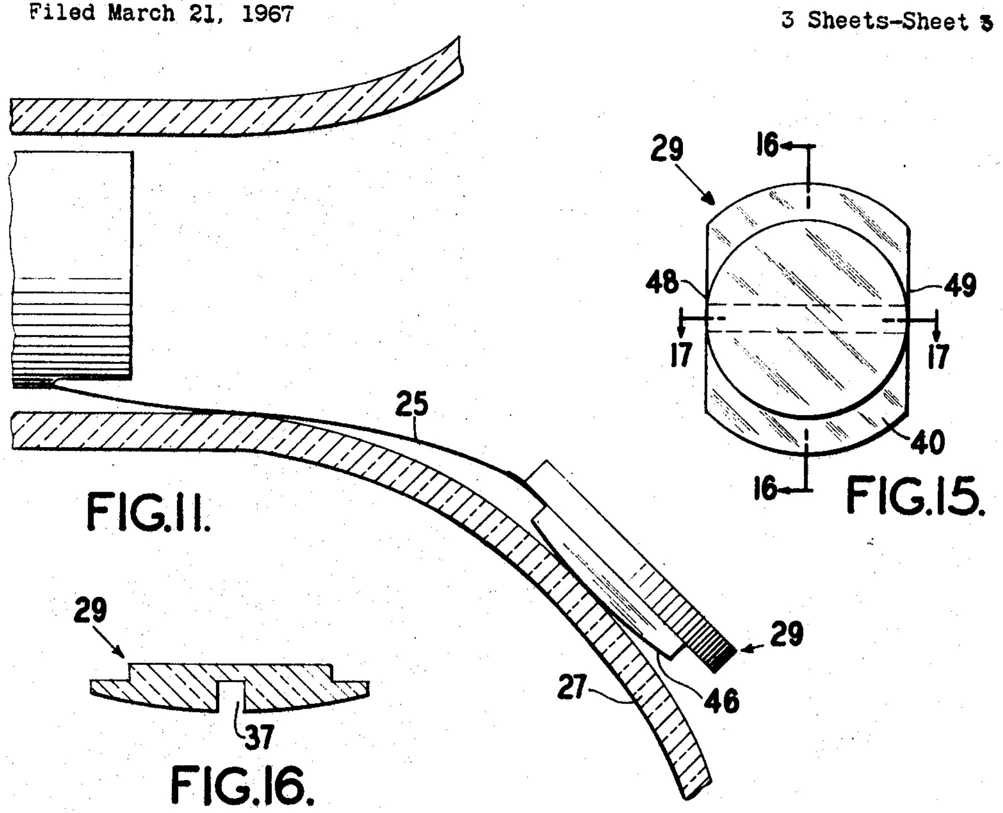
FIG. 11 is a partial schematic view of a television tube, similar to FIG. 1, showing the positioning of a getter assembly having another embodiment of the insulator.
FIG. 15 is a plan view of another embodiment of an insulator member.
FIG. 16 is a view in cross-section taken along line 16—16 of FIG. 15.

FIGS. 11, 12 and 13 show a preferred embodiment of an insulator member. The member 29 is similar to the members previously shown except that the lower face 46 is convexly curved or dome shaped. As shown in FIG. 13, the dome-shaped member 29 engages the wall 27 of the tube in a mating relationship which contributes to the stability of the arrangement and keeps the getter container oriented properly for delivery of vaporized material into the body of the tube. The insulator member may have, for example a total thickness at its center of about 0.15 inch, made up of a 0.05 inch at the ledge and about 0.1 for the dome at its fullest point. The recess 37 extends completely across the member with a depth of 0.05 inch at its ends and 0.1 inch at the center so that the bottom wall of the recess is parallel and in the same plane as the bottom walls of the channel ring which are thus exposed at the opposite ends of the recess.

Figure 14:
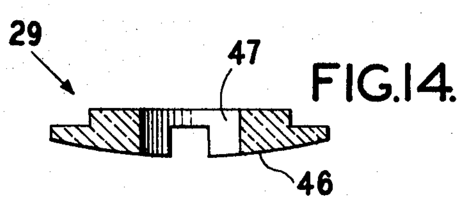
FIG. 14 is a view in cross-section of another embodiment of the insulator member shown in FIGS. 11, 12 and 13.

FIG. 14 shows a view parallel to the recess in a member 29 having a dome-shaped bottom face 46 as well as a cut out opening 47.

Figure 17:
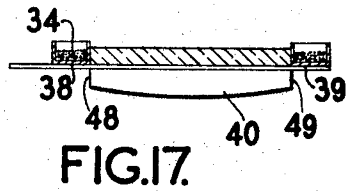
FIG. 17 is a view in cross-section taken along line 17—17 of FIG. 15 shown as assembled with a channel ring getter container.
Figure 18:
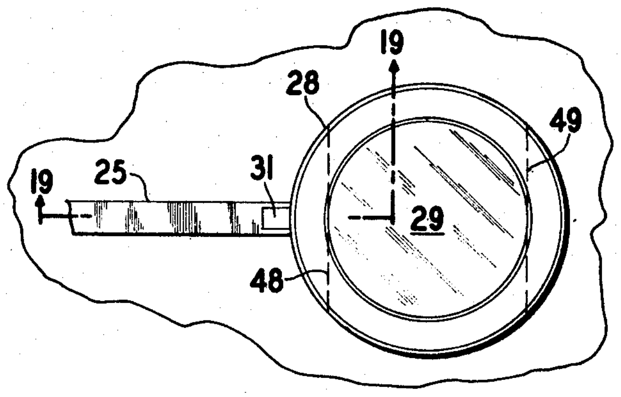
FIG. 18 is a plan view of a portion of a picture tube and the getter assembly of FIGS. 15, 16 and 17 shown mounted on an antenna support arm.
Figure 19:
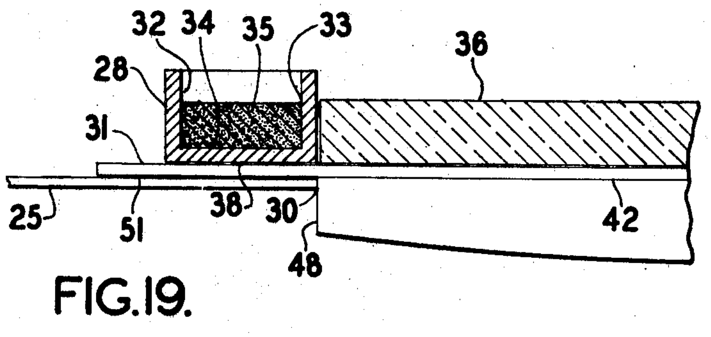
FIG. 19 is an enlarged view taken along line 19—19 of FIG. 18 showing the manner of attaching the getter assembly to the antenna support arm.

FIGS. 15, 16 and 17 show another embodiment of the invention wherein the insulator member 29 has its ledge portion 40 squared off or removed at edges 48 and 49. These edges are formed perpendicular to the axis of the recess, i.e., as chords of the circular member, and expose the whole of bottom surfaces 38 and 39 of the channel container bottom wall 34. The purpose of the squared off edges is shown in FIGS. 18 and 19. As seen there, the antenna support arm 25 is placed under the extension or tab 31 such that the end 30 of the support arm, which should itself be square, abuts against the square edge 48 of the insulator member. The antenna arm 25 is now properly aligned with reference to the tab 31 and one or more spot welds may be made at site 51. When mounted in the tube, an axial alignment of the getter container in the tube is thus ensured. Such would not necessarily result if the end 30 of the antenna arm abutted against a curved portion of an insulator member. Both edges 48 and 49 are preferably squared-off so that the insulator member can be used in either position and so that the member can be handled by automatic equipment which uses the squared-off edges as a positioning guide.

The getter assembly is put together as follows: the channel ring container 28 is formed and getter material 35 pressed into the space formed by the side walls 32–33 and bottom wall 34. An insulator member 29 is placed under the container with its raised portion 36 fitting inside the core opening of the container with its raised portion 36 fitting inside the core opening of the container. A mounting bar 42 is placed in the recess 37 in the insulator member with one end of the bar extending past the edge of the assembly to form a mounting tab 31. The mounting bar 42 is spot welded at one or more points at each end of the recess where the lower surfaces 38–39 of the bottom wall of the container is exposed. These welds can be made at each end of the recess by pressing the mounting bar against the channel bottom wall 34 at each end of the recess with a welding electrode while making contact to the channel container at one of the side walls 32 or 33 with the other welding electrode.

The tab 31 of the so formed getter assembly is then spot welded as previously described to the end 30 of the spring arm 25.

It is to be noted that while the invention has been described in regard to ring-shaped channel containers, that it is not so limited and that other types and configurations of getter containers can be used by changing the configuration of the insulating member to match that of the selected container. Additionally, it is to be noted that other compositions and configurations of insulating members than those shown and described herein are within the scope of this invention.

What is claimed is:

1. An improved getter assembly for mounting in an electron tube in an abutting relationship to a wall of the tube, comprising a channel container having opposing side walls and a bottom wall connecting said side walls and having getter material pressed into the space formed by said side walls and the bottom wall, a thermally insulating member underlying the bottom wall of the container, said insulating member having a recess extending across its lower face, a metallic support member positioned in the recess against the bottom wall of the recess with end portions of the metallic member joined to opposite portions of the getter container so as to hold the insulating member in place under the getter container, whereby the getter assembly can be mounted in an electron tube with the underlying insulating member abutting a glass wall of the tube and insulating the glass wall from the metallic getter container.

2. The getter assembly of claim 1 in which the metallic member extends past one edge of the channel container forming a tab for connection to a getter assembly support in the electron tube.

3. An improved getter assembly for mounting in an electron tube in an abutting relationship to a wall of the tube, comprising a channel ring container having opposing side walls and an annular bottom wall connecting said side walls and having getter material pressed into the space formed by the side walls and the bottom wall, a disc-shaped insulating member underlying the bottom wall of the container, said disc-shaped member having on its upper face a raised central portion fitting inside the open core of the channel ring container with the annular peripheral ledge portion of said member face abutting the bottom wall of the channel ring container, the bottom face of said disc-shaped member having a recess extending across a diameter of the disc, said recess having a depth sufficient to expose the bottom wall portions of the getter container at each end of the recess, an elongated metallic member positioned in the recess against the bottom wall of the recess with said metallic member connected near each end of the recess to the respective exposed portions of the bottom wall of the getter container thereby supporting the insulating member in place under the getter container, whereby the getter assembly can be mounted in an electron tube with the underlying insulating member abutting a glass wall of the tube and insulating the glass wall from the metallic getter container.

4. The getter assembly of claim 3 in which one end of the metallic member extends past one edge of the channel container forming a tab for connection to a getter assembly support in the electron tube.

5. The getter assembly of claim 3 in which the metallic member is spot welded to the exposed bottom wall portions of the getter container bottom wall.

6. The greater assembly of claim 3 in which the insulating member has a central core opening extending through the member, the diameter of the core opening being less than the diameter of the raised portion of the member.

7. The getter assembly of claim 3 in which the upper and lower faces of the insulating member are parallel to each other and to the plane formed by the annular bottom wall of the channel ring container.

8. The getter assembly of claim 3 in which the lower face of the insulating member has a raised, rounded, annular ridge around its periphery.

9. The getter assembly of claim 3 in which the lower face of the insulating member is a convex surface.

10. The getter assembly of claim 9 in which the lower face of the insulating member is a convex surface curved for stable mounting against a concave surface of a selected cross-section of a tube.

11. The getter assembly of claim 4 in which the insulating member has a flat edge lying in the plane of a chord perpendicular to the axis of the recess and in the vicinity of the tab extension of the metallic member, whereby a support arm can be axially aligned and then connected to the getter assembly tab by abutting a squared-off end of said arm against the flat edge of the insulating member under the tab and then welding the tab to the support arm.

12. The getter assembly of claim 11 in which the insulating member has flat edges near both ends of the recess whereby the insulating member can be assembled under the getter container and the metallic member can be connected with the tab extension located at either end of the recess.

13. An improved getter assembly for mounting in a television picture tube in an abutting relationship to a wall of the tube, comprising a channel ring container having opposing side walls and an annular bottom wall connecting said side walls and having getter material pressed into the space formed by the side walls and the bottom wall, a partially disc-shaped ceramic insulating member underlying the getter container, said insulating member having on its upper face a raised central portion fitting inside the open core of the channel ring container with the peripheral ledge portion of said member face abutting the bottom wall of the channel ring container, said member having flat edge portions cut along parallel chords exposing opposite segments of the annular bottom wall of the container, and said insulating member having in its lower face a recess perpendicular to said flat edges, the floor of said recess being in the plane of the annular bottom wall of the container, and an elongated metallic member in said recess connected to the bottom wall of the container of each exposed segment of said bottom wall, one end of said metallic member extending past the edge of said container forming a tab for connection to a getter assembly support in the tube.

14. The getter assembly of claim 13 in which the lower face of the insulating member is convex shaped for stable mounting against a concave surface of a selected cross-section of the tube in a preferred alignment within said tube for directing getter material into a desired portion of the tube.

15. The getter assembly of claim 13 in which the getter material is an exothermic material.

References Cited

UNITED STATES PATENTS

| | | | |
|---|---|---|---|
| 3,239,134 | 3/1966 | Steele. | |
| 3,086,137 | 4/1963 | Eicken | 206—0.4 X |
| 3,207,294 | 9/1965 | Farrar et al. | 206—0.4 |

MARTHA L. RICE, *Primary Examiner.*